United States Patent

[11] 3,552,330

| | | |
|---|---|---|
| [72] | Inventor | Donald W. Youmans<br>San Jose, Calif. |
| [21] | Appl. No. | 813,806 |
| [22] | Filed | Mar. 27, 1969 |
| [45] | Patented | Jan. 5, 1971 |
| [73] | Assignee | FMC Corporation<br>San Jose, Calif.<br>a corporation of Delaware |

[54] ARMORED CLOSURE FOR AN AIRCRAFT HANGAR
10 Claims, 8 Drawing Figs.

[52] U.S. Cl. .................................................. 109/1,
49/366, 52/204
[51] Int. Cl. ...................................................... E05g 1/02
[50] Field of Search .......................................... 109/1, 15,
57, 64; 52/86, 169, 204, 205; 49/366

[56] References Cited
UNITED STATES PATENTS

| | | | |
|---|---|---|---|
| 2,704,983 | 3/1955 | Dronkelaar .................. | 109/15 |
| 2,789,668 | 4/1957 | Martin.......................... | 52/86X |
| 3,226,907 | 1/1966 | Gregoire ...................... | 52/86X |
| 3,475,861 | 11/1969 | Hillseth ........................ | 49/366X |

*Primary Examiner*—Kenneth Downey
*Attorneys*—F. W. Anderson and C. E. Tripp

ABSTRACT: A hangar is provided with a transverse apertured bulkhead, inward of its open end, that is supported on a truss framework which is mounted free of the hangar structure. Armor plate clamshell doors pivoted for horizontal swinging movement to the truss lie inward of the end of the hangar and clear of the bulkhead aperture when open, and cooperatively form an inverted prow-shaped outer deflecting surface when closed.

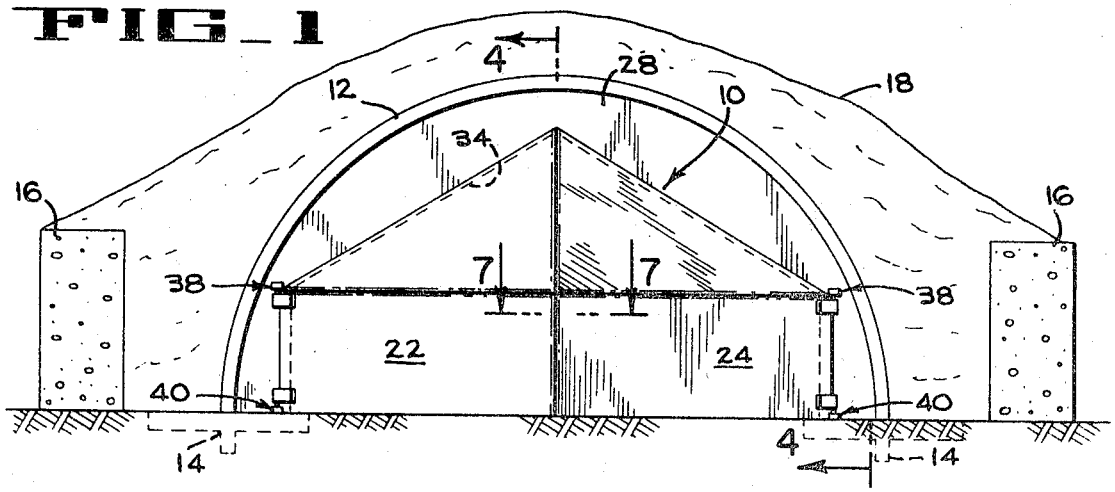
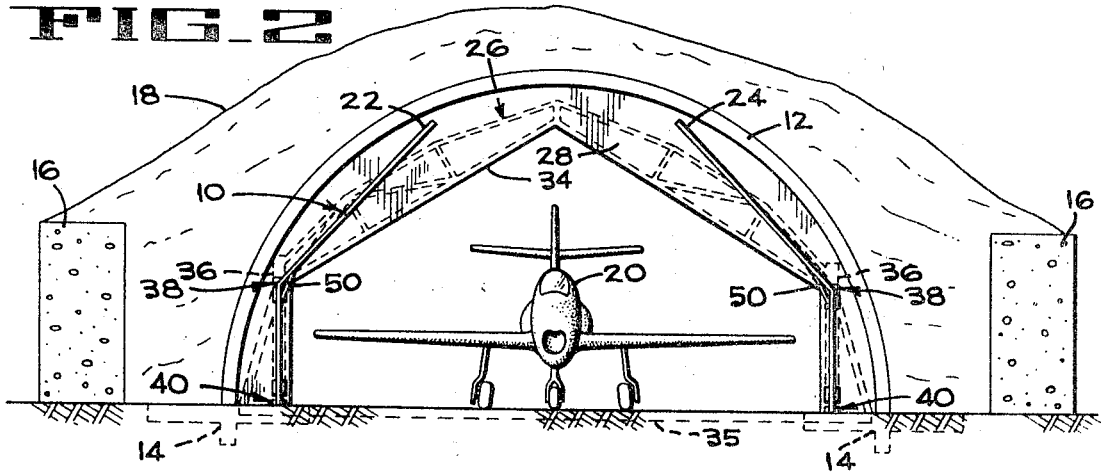
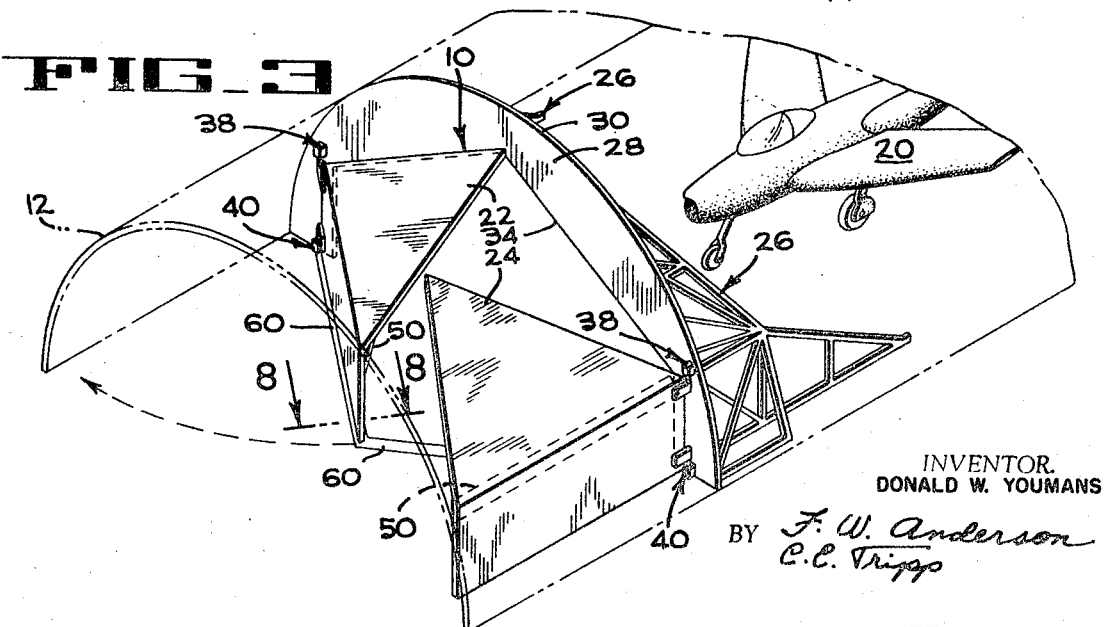
INVENTOR.
DONALD W. YOUMANS

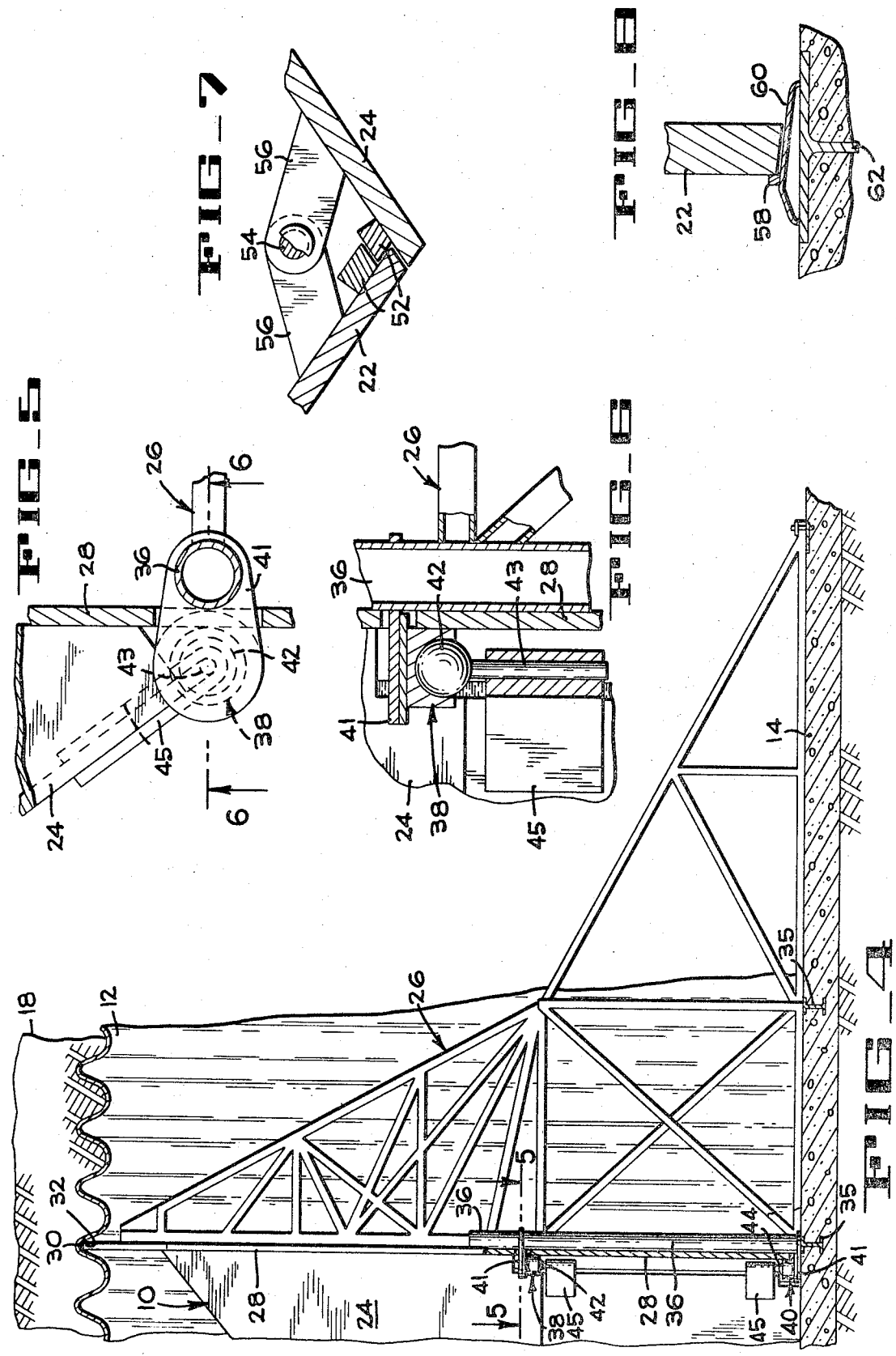

ARMORED CLOSURE FOR AN AIRCRAFT HANGAR

BACKGROUND OF THE INVENTION

The present invention pertains to hangar structures for aircraft, and more particularly concerns an armored end closure suitable for use on various military hangar-type structures.

One proposal to protect military aircraft consists of parking the aircraft within a hangar constructed, along the lines of the well known Quonset hut, of prefabricated arcuate sections of corrugated metal which are interconnected to form an elongate arch. The entire hangar is covered with earth, and one end of the hangar is substantially closed with limited access means for the crew members. The present invention provides an armored end closure which can be rapidly opened and closed for moving aircraft into or out of the hangar, and which when opened lies totally within the hangar and when closed completely screens the interior of the hangar. These functions are achieved by structure according to the present invention without any mechanical connections between the end closure and hangar structure. In this way, possible damage to the end closure will not necessarily damage the hangar structure.

SUMMARY OF THE INVENTION

An armored bulkhead defining a gabled opening is mounted on a truss framework that is supported independently of the hangar structure. A pair of armored clamshell doors cooperatively define an inverted prow-shaped closure which abuts the bulkhead in the closed positions of the doors so that the force of projectiles deflected by the doors and bulkhead is resisted by the truss framework alone. Due to the geometrical configuration of the doors, in open positions they are clear of the gabled opening and inward of the end of the hangar. Each door comprises only two planar armor panels and is self-supporting with only minor reinforcing.

BRIEF DESCRIPTION OF THE DRAWINGS

FIG. 1 is a diagrammatic end elevation of a prefabricated hangar of the known Quonset type incorporating the armored door closure of the present invention.

FIG. 2 is a diagrammatic end elevation similar to FIG. 1 with the doors in open positions.

FIG. 3 is a fragmentary diagrammatic isometric illustrating the armored door closure, within the phantom outline of a prefabricated hangar, with one door open and the other door closed.

FIG. 4 is a vertical section, partially broken away, taken substantially along lines 4-4 on FIG. 1, and at an enlarged scale.

FIG. 5 is a horizontal section, at enlarged scale, taken along lines 5-5 on FIG. 4.

FIG. 6 is a section taken along lines 6-6 on FIG. 5.

FIG. 7 is a horizontal section, at enlarged scale, taken along lines 7-7 on FIG. 1.

FIG. 8 is a vertical enlarged section through the threshold indicated by lines 8-8 on FIG. 3.

DESCRIPTION OF THE PREFERRED EMBODIMENT

The armored door closure 10 (FIGS. 1—3) of the present invention has special utility with a prefabricated military hangar structure 12 of the well known Quonset type in which arcuate sections of corrugated metal are bolted together to form a semicylindrical arch. In one type of installation, the hangar is erected on concrete foundations 14 between a pair of buttresses 16, and an earth cover 18 is placed over the entire structure to provide overhead protection of the hangared aircraft 20. The armored door closure 10 provides armor plate clamshell doors 22 and 24 which in closed positions preclude missile fragments entering the open end of the hangar and damaging the relatively fragile aircraft.

In order to physically isolate the door closure 10 from the hangar structure 12 so that possible damage to the door will not necessarily affect the hangar, the doors are mounted on a truss framework 26 that is bolted to the foundation 14 and is secured to an armor plate bulkhead 28. Both the truss framework and the armored bulkhead are free of the hangar structure; there are no mechanical connections of any kind between the truss-bulkhead and the hangar. As best shown in FIG. 4, the arcuate outer edge 30 of the bulkhead 28 is nested within one transverse corrugation 32 so that there is no direct opening into the hangar structure.

A gable shaped aperture 34 (FIGS. 1 and 2) is defined by the inner edge of the bulkhead 28. The truss framework 26 transversely spans the hangar behind the bulkhead but lies totally clear of the gable shaped aperture so that the entire aperture is open for movement of the aircraft into and out of the hangar. The bulkhead aperture closely conforms to the end profile of the aircraft, as best shown in FIG. 2. Beams 35 (FIG. 4) are imbedded in the floor of the hangar and interconnect the two side portions of the truss framework.

The side portions of the truss framework 26 (FIG. 4) are similarly constructed and each portion includes an upright stanchion post 36, FIG. 2, that carries upper and lower ball socket members 38 and 40, respectively. Mounting plates 41 which interconnect the posts 36 and the socket members extend through apertured portions of the armor plate bulkhead 28 and the socket members cooperate with ball hinge members 42 and 44 that are affixed to the associated door 22 or 24. For the latter purpose each ball hinge member is secured to a shaft 43 that is rigidly connected to a U-shaped leaf 45 that straddles and is fastened to the edge of the door 24 as shown in FIG. 5. The socket member 40 resists the downward thrust of the door, and the socket member 38 is oppositely oriented so that the door is both guided for swinging movement and restrained from upward movement by the upper hinge components.

In order to clear the opening in the bulkhead 28 with the doors in the FIG. 2 open positions, it is desirable to minimize the thickness of the doors. Thus, the doors 22 and 24 are formed of armor plate welded and bolted into an integral unit and are self supporting with only minor reinforcing. As best shown in FIG. 3, each door includes a planar lower panel of rectangular shape, and a planar upper panel of triangular shape. Across the welded juncture of these panels and inside the door, a thick rectangular plate 50 is welded to the door panels and rigidifies the door without encroaching the bulkhead opening. In order to rigidify the free edges of the doors and to provide a fragment shield when the doors are closed, a bar 52 (FIG. 7) is secured along the inner surface of each door. The doors may be locked together in closed positions by a pin 54 which is inserted in aligned apertures of tabs 56 that are secured one to each door and overlap when the doors are closed. If the tabs are elevationally positioned at an appropriate height, an aircraft tug, not shown, may be used in lieu of manual operation. To complete the shielding of the interior of the hangar, the inside bottom edge of each door 22 and 24 is arranged to abut a sealing bar 58 (FIG. 8) that is integral with a threshold 60. The threshold is secured to a beam 62 that is embedded in the floor of the hangar.

From the preceding description, it is believed evident that an important aspect of the present invention is the provision of clamshell doors which cooperatively form an armored shield in the general form of an inverted prow, that the doors are easily constructed of planar, uncurved panels, and that possible door damage is not likely to damage the hangar structure because the doors are mounted on the truss framework independent of the hangar structure. It will be apparent, also, that the bulkhead-truss-door assembly is not limited to use with Quonset type structures, but can be readily installed by those skilled in the building arts to a variety of different types of buildings. Though gabled bulkhead openings most nearly approach the end profile of aircraft, it is evident that a gabled-shaped opening is not an essential requirement. It is also apparent that it is preferable that the doors in closed positions abut the bulkhead above the opening so that shock forces against the doors are resisted by the truss framework.

Although the best mode contemplated for carrying out the present invention has been herein shown and described, it will be apparent that modification and variation may be made without departing from what is regarded to be the subject matter of the invention.

I claim:

1. A door closure for the open end of an aircraft hangar structure comprising a bulkhead having a door opening formed therein, a truss surrounding said opening and having side portions projecting into the hangar but clear of the door opening, means supporting said bulkhead and truss at one end of and independent of the hangar structure, and half doors pivotally mounted on said truss at the side portions thereof, said bulkhead thus transmitting to the truss shock loads directed against the closed doors to protect the hangar structure from said shock loads.

2. An armored closure for the open end of a hangar comprising an armored bulkhead spanning said open end and defining an access opening into the hangar, truss means supporting said bulkhead independent of the hangar structure, and a pair of armored doors mounted on said truss for horizontal swinging separating movement away from a vertical plane bisecting said bulkhead opening, each door including planar armor panels diagonally related to said plane for deflecting projectiles and blast forces striking the closed doors, said panels cooperatively defining a profile larger than said opening when the doors are open and having edge portions adjacent said bulkhead when the doors are in closed positions.

3. An end closure for a prefabricated hangar comprising an armor plated truss extending across and within one open end portion of the hangar, the armor of said truss defining a downwardly open aperture, means supporting said truss independently of the hangar structure, hinge means mounted on said truss at each side of said aperture, an armored half door mounted on each hinge means for swinging movement about an upright pivot axis, said doors including planar lower panels cooperatively converging outwardly from the hinge means to define laterally diverging projectile deflecting surfaces, and planar upper panels cooperatively defining inclining projectile-deflecting surfaces merging with said lower panels and having terminal upper edges abutting the truss armor, inward forces against said doors being resisted by said truss and being thus isolated from the structure of the hangar.

4. In a prefabricated hangar structure the improvement comprising a truss including means defining a pivot axis adjacent the open end and near each side of the hangar, ground support means anchoring said truss independently of the hangar structure, an armored bulkhead extending across said open end of the hangar and connected to said truss means but independent of the hangar structure, said bulkhead defining an opening closely conforming to the front profile of an aircraft, and a pair of armored half doors pivotally mounted for movement about said hinge axes and spanning said bulkhead opening in closed positions, said doors in open positions being clear of said aircraft profile and in closed positions having portions abutting said bulkhead, forces directed inward against the closed doors thus being opposed by the truss-supported bulkhead and said ground support means for said truss, but isolated from the hangar structure.

5. Apparatus according to claim 4 wherein said doors in open positions are inward of the open end of said hangar.

6. Apparatus according to claim 4 wherein said doors in closed positions cooperatively define outer deflecting surfaces diverging toward the hangar.

7. Apparatus according to claim 4 wherein said doors in open positions are within the open end of the hangar and in closed positions cooperatively define outer deflecting surfaces diverging toward the hangar.

8. Apparatus according to claim 7 wherein each of said doors is of unitary armor plate construction to reduce the probability of door fragmentation.

9. Apparatus according to claim 4 wherein said bulkhead opening is provided with upright lateral edges joining a gable shaped intermediate edge, each of said doors including an upright lower panel converging outward from its pivot axis toward a vertical plane longitudinally bisecting the hangar, and a triangular panel having a first edge welded to the upper edge of said lower panel, a second edge substantially tangent to said plane and a third edge abutting said bulkhead along a line substantially parallel to one sloping side of said gable shaped edge, the doors in closed positions thus defining an inverted prow shaped deflecting structure, and in open position closely conforming to the gable shaped bulkhead opening.

10. An armored door closure of inverted prow shape for the open end of a hangar comprising an apertured armored bulkhead spanning said opening; a truss supporting said bulkhead independent of the hangar structure; and a pair of clamshell doors mounted on said truss for horizontal separating movement; each door including only two planar outer surface panels, an upright generally rectangular lower panel extending outward from said bulkhead to a vertical plane bisecting said bulkhead and the hangar, and a triangular panel having one edge secured to said rectangular panel, another edge coincident with said plane, and the remaining edge adjacent said bulkhead.